United States Patent [19]
Milhizer et al.

[11] Patent Number: 5,692,166
[45] Date of Patent: Nov. 25, 1997

[54] METHOD AND SYSTEM FOR RESYNCHRONIZING A PHASE-SHIFTED RECEIVED DATA STREAM WITH A MASTER CLOCK

[75] Inventors: Eric Richard Milhizer, Fort Worth, Tex.; Theodore Lawrence Willke, II, Madison, Wis.; Peter David Novak, Fort Worth, Tex.

[73] Assignee: Motorola, Inc., Schaumburg, Ill.

[21] Appl. No.: 635,000

[22] Filed: Apr. 19, 1996

[51] Int. Cl.[6] ....................................... G06F 1/04
[52] U.S. Cl. ........................ 395/551; 395/558; 395/559; 375/355; 375/371; 375/375
[58] Field of Search ......................... 395/551, 558, 395/559; 375/220, 354, 355, 356, 362, 371, 375

[56] References Cited

U.S. PATENT DOCUMENTS

| | | | |
|---|---|---|---|
| 4,633,487 | 12/1986 | Goeb et al. | 375/118 |
| 4,756,011 | 7/1988 | Cordell | 375/118 |
| 5,278,873 | 1/1994 | Lowrey et al. | 375/118 |
| 5,428,648 | 6/1995 | Fukuda | 375/371 |
| 5,539,784 | 7/1996 | Brauns et al. | 375/360 |

*Primary Examiner*—Dennis M. Butler
*Attorney, Agent, or Firm*—Bruce Terry

[57] ABSTRACT

A method and system in a data processing system for resynchronizing a received data stream with a master clock having a master clock frequency, wherein the received data stream is clocked with a received data clock that is out of phase with the master clock by an arbitrary number of degrees. The master clock and the received data clock are compared at a frequency of a resynchronization clock for a predetermined number of times to produce comparison results. The resynchronization clock frequency may be less than the frequency of the master clock. The comparison results are analyzed to produce a relative phase indicator. In response to the relative phase indicator exceeding, or being less than, a phase shift threshold, the received data stream is reclocked at a rising or falling edge of the master clock to produce a resynchronized data stream, wherein the resynchronized data stream is synchronized with the master clock and contains the data of the received data stream.

26 Claims, 6 Drawing Sheets

METHOD AND SYSTEM FOR RESYNCHRONIZING A PHASE-SHIFTED RECEIVED DATA STREAM WITH A MASTER CLOCK

FIELD OF THE INVENTION

The present invention is related in general to synchronous digital data processing systems, and more particularly to an improved method and system for resynchronizing a received data stream to produce a resynchronized data stream that is synchronized with a master clock.

BACKGROUND OF THE INVENTION

In synchronized digital data processing systems, it is frequently necessary to resynchronize a synchronous data stream, when, for example, the synchronous data stream has been synchronously clocked with a remote clock that is out of phase with a master or local clock by an arbitrary number of degrees.

FIG. 1 shows a typical data processing system that requires resynchronization of a received data stream. As depicted, master system 20 is coupled to remote system 22 by synchronous data links 24 and 26. Synchronous data link 24 includes clock signal 28 and data signal 30. Similarly, synchronous data link 26 includes clock signal 32 and data signal 34.

In operation, synchronous data 36, which is synchronized with master clock 38, may be transmitted to remote system 22 by synchronous data link or synchronous communication link 24. When clock signal 28 and data signal 30 are received at remote system 22, these signals are out of phase with the phase of master clock 38 because of the time delay incurred traveling or propagating from master system 20 to remote system 22. Such time delay is related to the distance between master system 20 and remote system 22, no matter what medium is used for communications links 24 and 26. Examples of media that may be used for communications links 24 and 26 include air (infrared or radio frequency interface), conducting cable, or optical fiber.

Once data 30 and clock 28 are received at remote system 22, remote system 22 typically processes such data and sends the processed results back to master system 20. Such processing is depicted at block 40, and data returning to master system 20 is transmitted via communications link 26. Both the processing and the transmission of results back to system 20 add additional time delay to clock signal 32 and data signal 34 relative to data and clock signals in master system 20.

Because data in master system 20 is synchronized to master clock 38, and because data received from remote system 22 will be used by data processing operations (not shown) within master system 20, data received via communications link 26 should be resynchronized with master clock 38 so that such received data may be properly interpreted and incorporated in the data processing operations in master system 20. Data resynchronizer 40 provides a means for resynchronizing received data and supplying a resynchronized data output stream.

In some data resynchronizing systems, the resynchronizing process requires a clock having a frequency that is higher than the frequency of master clock 38. Such a "higher frequency" clock may be used to sample and compare the out-of-phase received clock signal and the master clock signal by taking multiple samples of both clocks over a time frame of a single period of the master clock. The disadvantage of this type of prior art resynchronizer is that such a high frequency clock signal is not always available within master system 20. Furthermore, providing such a high frequency clock adds expense, complexity, and more components, which may reduce the reliability of the resynchronizer.

Other resynchronizer circuits may examine data error rates and use such data error rates to select either a rising edge or falling edge of the master clock to resynchronize an incoming data stream. This solution has the disadvantage of requiring an examination of the data stream and making a complex decision under the control of software or microcode.

Still other data resynchronizing systems may perform data resynchronization based upon a known, fixed time delay between master system 20 and remote system 22. This has the disadvantage of being inflexible, in that the system cannot be reconfigured without considering whether or not phase shift has been changed in the system because of a change in cable lengths, or a change in the distance between master system 20 and remote system 22, or a change in processing in remote system 22. These changes may affect the data resynchronization process.

Therefore, it should be apparent that a need exists for an improved method and system for efficiently resynchronizing a received data stream with a master clock, wherein the received data has been clocked with a received data clock that is out of phase with the master clock by an arbitrary number of degrees.

BRIEF DESCRIPTION OF THE DRAWINGS

The novel features believed characteristic of the invention are set forth in the appended claims. The invention itself, as well as a preferred mode of use, further objects, and advantages thereof, will best be understood by reference to the following detailed description of an illustrative embodiment when read in conjunction with the accompanying drawings, wherein:

DETAILED DESCRIPTION OF THE INVENTION

Figure 1:
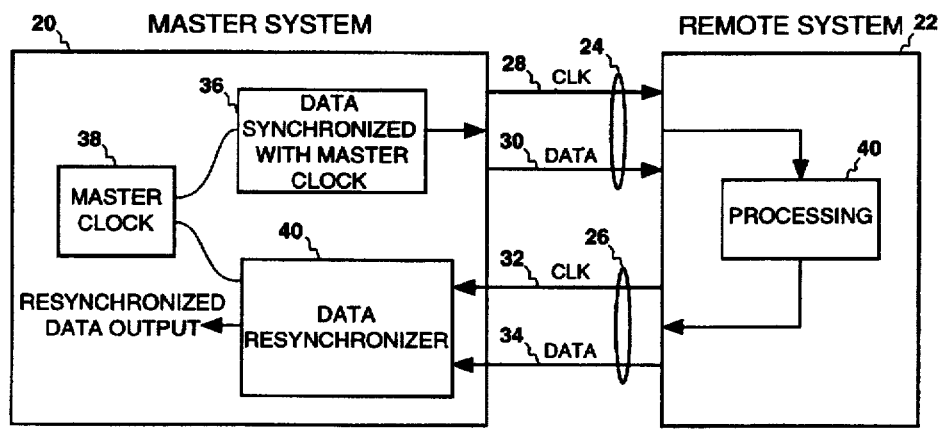
FIG. 1 depicts synchronous data communication between a master data processing system and a remote data processing system.
Figure 2:
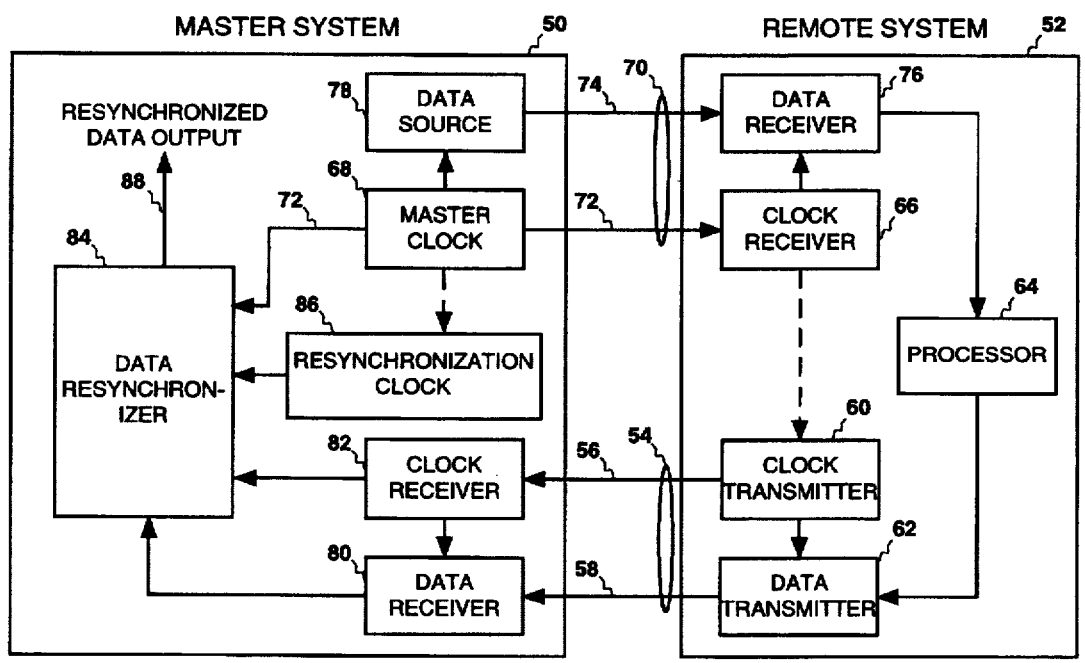
FIG. 2 is a high-level block diagram that illustrates a method and system for resynchronizing a received data stream in accordance with an embodiment of the method and system of the present invention.

With reference now to the figures, and in particular with reference to FIG. 2, there is depicted a high-level block diagram of the method and system for resynchronizing a received data stream with a master clock in accordance with an embodiment of the present invention. As is shown, master system 50 is coupled to remote system 52 via a synchronous data communications link 54. Communications link 54 includes received data clock 56 and received data 58. Received data 58 may be one or more bits wide.

Remote system 52 includes clock transmitter 60, which is used to "clock" data present at the input of data transmitter 62.

Data transmitter 62 typically receives data from processor 64, following any digital signal processing operation that may have been performed by processor 64. Note that a data signal passing through, and being processed by, processor 64 may be delayed.

For data resynchronization to occur in master system 50, data transmitted via synchronous data communications link 54 is preferably transmitted at the same frequency as that used by data in master system 50. In a typical application, clock transmitter 60, and hence data transmitter 62, are frequency-locked to a clock received by clock receiver 66 in remote system 52. As shown in FIG. 2, clock receiver 66 may receive a clock signal from master clock 68 in master system 50. Master clock 68 may be received via synchronous data communications link 70, which includes master clock signal 72 and data signal 74. Data receiver 76 may be used in remote system 52 to receive data and pass such data to processor 64.

Within master system 50, master clock 68 is used to synchronize data, such as data source 78. The problem solved by the present invention arises when data received by data receiver 80 is out of phase with data in master system 50 by an arbitrary number of degrees. Even though these two data streams are out of phase, they have typically been modulated at the same frequency. To more efficiently process data in master system 50 the out-of-phase data received by data receiver 80 must be resynchronized with the data in master system 50, like, for example, the data supplied by data source 78. Note that the data signal received by data receiver 80 is synchronized with a received data clock signal 56, which is received within master system 50 by clock receiver 82.

Data resynchronizer 84 reclocks data from data receiver 80 with the best master clock edge, which is selected by considering a period for sampling when received data 58 is most stable. According to an important aspect of the present invention, data resynchronizer 84 resynchronizes received data utilizing resynchronization clock 86, which advantageously may have a lower frequency than the frequency of master clock 68. This is an advantage because a clock having a higher frequency than the master clock may not be available in master system 50, and creating or supplying an additional higher-frequency clock may be expensive, consume valuable power and circuit space, and cause electromagnetic interference (EMI) problems. Resynchronization clock 86 is preferably another stable periodic signal that is not a $2^n$ multiple of the frequency of master clock 68, where n is any positive or negative integer.

The output of data resynchronizer 84 is a synchronous data stream 88 having data that changes state on either the rising or falling edge of master clock 68, wherein the selection of the rising or falling edge is determined by data resynchronizer 84. Thus, resynchronized data output 88 will either be in phase, or 180° out of phase with data from data source 78, depending upon the phase difference between master clock 72 and received data clock 56. This phase difference is used to determine which edge of master clock 72 is selected for resynchronization.

Figure 3:
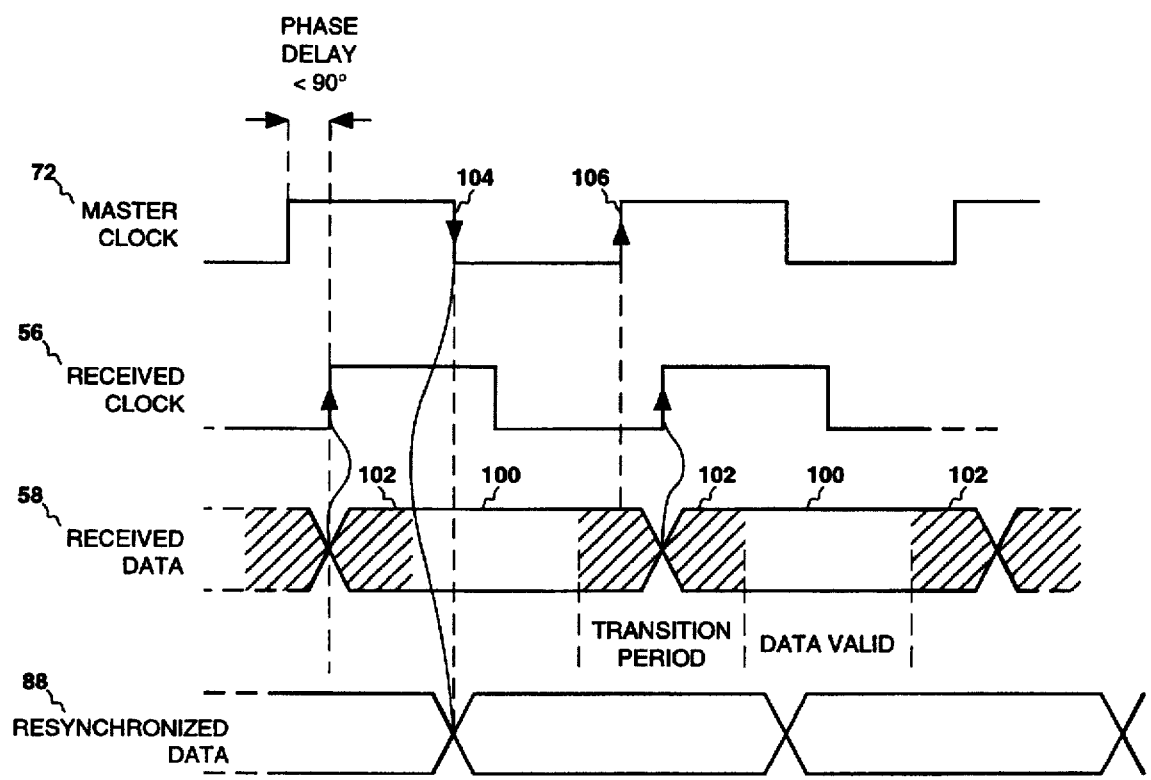
FIG. 3 is a logical timing diagram that illustrates resynchronization of received data when the phase delay of the received data leads or lags by 90° in accordance with the method and system depicted in FIG. 2.

Referring now to FIG. 3, there is depicted a logical timing diagram that depicts resynchronization of received data with a master clock in accordance with an embodiment of the method and system of the present invention. As is shown, received data clock signal 56 leads or lags master clock signal 72 by less than 90°. According to the present invention, to resynchronize received data 58 with master clock 72, received data 58 must be reclocked with either the rising or falling edge of master clock 72. FIG. 3 also shows that it is desirable to reclock received data 58 during data valid period 100. Data valid period 100 exists for a time after transition period 102, which is a period for data to stabilize after a clock edge that may change the state of received data 58. It is also a good design practice not to reclock received data 58 too close in time to the next edge of received clock 56 that may change received data 58. (In this example, the rising edge of received clock 56 is the next edge that may initiate a data change). Therefore, data valid period 100 occupies a centrally located period of time in the waveform of received data 58.

If such a centrally located data valid period 100 exists and is determined to be at least one-half the period of master clock 72, then either the rising edge or falling edge of master clock 72 will fall within data valid period 100 in received data 58. The particular edge that falls within data valid period 100 will be best choice of master clock edges for reclocking, and hence resynchronizing, received data 58 to produce resynchronized data 88.

In the example of FIG. 3, falling edge 104 occurs within data valid period 100, and thus should be selected to reclock received data 58 to produce resynchronized data 88. Rising edge 106 should not be selected because rising edge 106 occurs outside data valid period 100 and is too close to transition period 102 of received data 58. If received data 58 is reclocked with rising edge 106 of master clock 72, there is an increased chance of error due to jitter in received clock 56. Such jitter could cause the rising edge of received clock 56 to occur earlier than it should. If received clock 56 has jitter, clocking data on rising edge 106 may cause received data 58 to be sampled during data transition time 102, thereby causing undefined or erroneous data to be sampled.

Figure 4:
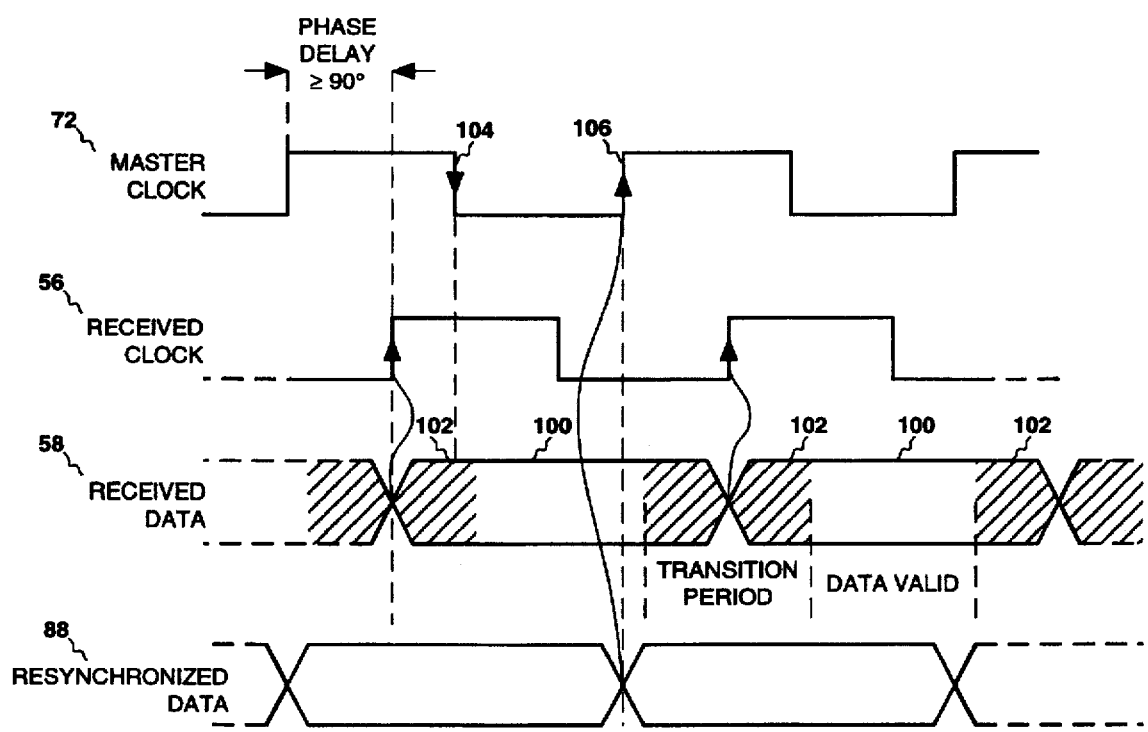
FIG. 4 is a logical timing diagram that illustrates resynchronization of received data when the phase delay is between 90° and 270° in accordance with the method and system depicted in FIG. 2.

With reference now to FIG. 4, there is depicted a logical timing diagram that shows resynchronization of received data when the received data clock is phase shifted from the master clock by a phase shift between 90° and 270°. Here, the phase shift between 90° and 270° may cause the present invention to select rising edge 106 as the best edge of master clock 72 for reclocking and resynchronizing received data 58. This is because rising edge 106 occurs within data valid period 100 in received data stream 58. The greater-than-90-degree phase shift places falling edge 104 in transition period 102, which is not a desired time for sampling received data 58. When rising edge 106 is selected to reclock received data 58, resynchronized data 88 is produced with the indicated time relationship to master clock 72.

Therefore, one of the problems solved by the present invention is the selection of either falling edge 104 or rising edge 106 for reclocking received data 58, and subsequently reclocking received data 58 with the selected edge to produce resynchronized data 88.

Figure 5:
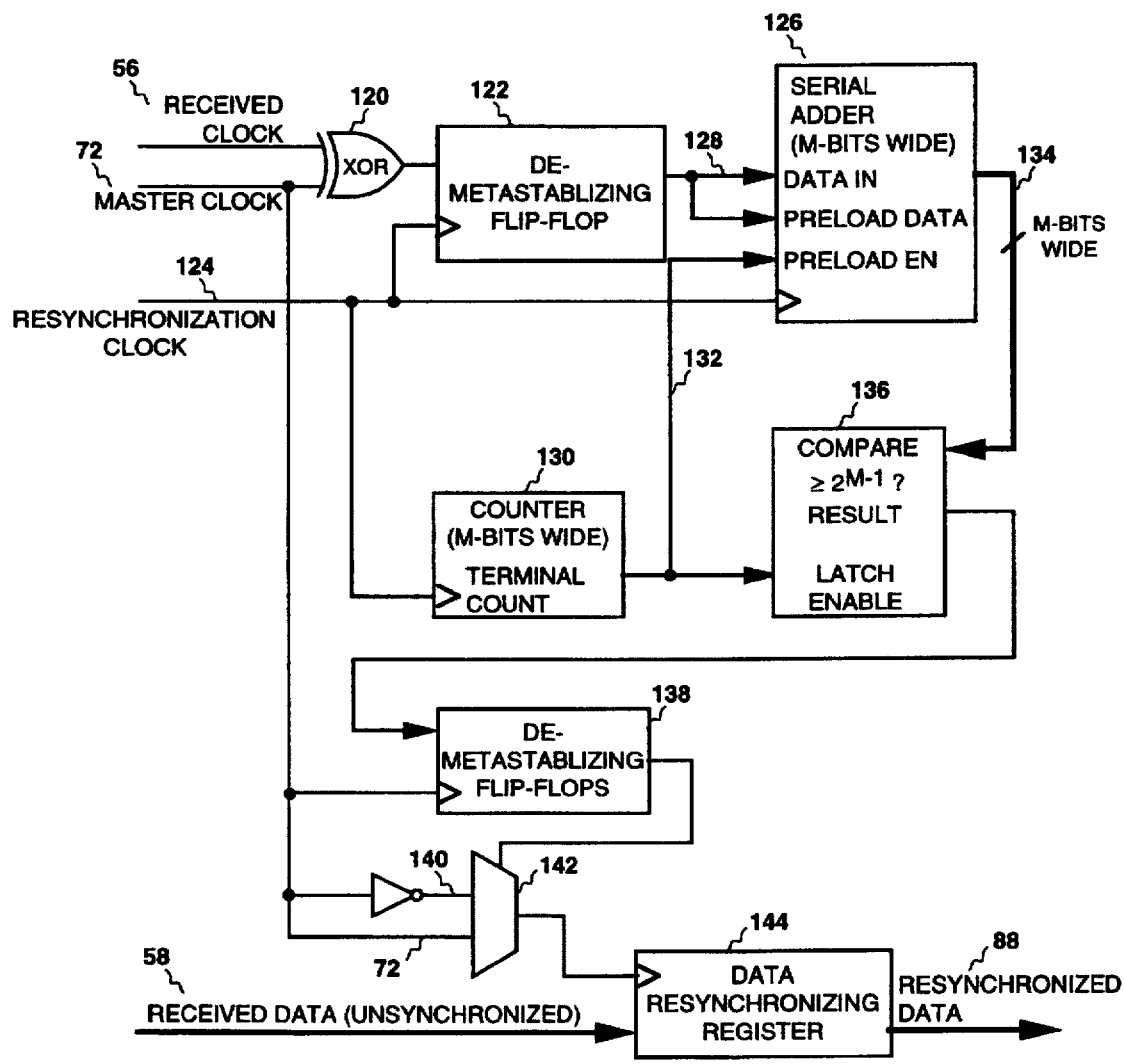
FIG. 5 is a high-level block diagram of a data processing system which may be used to implement an embodiment of the method and system of the present invention.

With reference now to FIG. 5, there is depicted a high-level block diagram of a data processing system for resynchronizing received data with a master clock signal in accordance with one embodiment of the method and system of the present invention. As illustrated, received clock 56 and master clock 72 are compared by a signal comparator to determine whether or not these two clock signals have the same value (or a different value). This signal comparator may be easily implemented by exclusive-OR gate 120, which produces a comparison result having a "zero" output when the two input signals are the same and a "one" output when the two signals are different. Other means for comparing received clock 56 and master clock 72 include circuits that perform the Boolean equivalent of the exclusive-OR function.

Latch 122 may be coupled to the output of exclusive-OR gate 120 to sample the output of exclusive-OR gate 120 at a frequency determined by resynchronization clock signal 124. This sampling produces "comparison results." Latch 122 may be implemented with a de-metastabilizing flip-flop. Such a de-metastabilizing flip-flop is used to stabilize the comparison results which prevents propagation of an unknown or metastable signal caused by attempting to latch a transitioning signal from the output of exclusive-OR gate 120.

As can be seen in FIG. 5, resynchronization clock 124 is used to control several components in the depicted resynchronization system. An advantage of the present invention is the ability to use a resynchronization clock that has a lower frequency than master clock 72. This is an advantage because the master clock in the data processing system is often the highest frequency clock signal available, and it would be an expensive use of data processing system resources to implement a higher frequency clock. Although a resynchronization clock having a lower frequency than the frequency of master clock 72 is preferred, resynchronization clock 124 may also have a higher frequency than master clock 72.

Comparison results produced by the comparison of received clock 56 and master clock 72 are then clocked into counter 126. In one embodiment of the present invention, counter 126 may be implemented with a serial adder which is M-bits wide. As depicted in FIG. 5, counter 126 counts the number of ones received at data input 128 when a clock signal is received from resynchronization clock 124.

Counter 126 continues to count the samples of the comparison result for a number of samples, which also defines a period of time, determined by M-bit wide counter 130. After counting ($2^M-1$) number of comparison results, counter 126 is reset by signal 132, which preloads the present comparison result in counter 126 and begins the counting process again.

Because resynchronization clock 124 has a different frequency from master clock 72, the results of comparing received clock 56 and master clock 72 are produced at different times, or at different phase angles, relative to a period or cycle of master clock 72. In other words, the locations of the comparison results counted by counter 130 should eventually traverse an entire cycle of both received clock 56 and master clock 72. Therefore, as a result of this traversing comparison between received clock 56 and master clock 72, the output of counter 126 is an M-bit number—which may be called a relative phase indicator—that represents a difference in phase between received clock 56 and master clock 72. Such a relative phase indicator value 134 is then sent from counter 126 to comparator 136.

Comparator 136 compares M-bit relative phase indicator 134 with a preselected predetermined M-bit number—which may be called a phase shift threshold—and produces an output based upon whether or not the input number (i.e., relative phase indicator 134) is greater than the preselected number (i.e., phase shift threshold). Comparator 136 may be implemented in hardware, firmware, or software.

In one embodiment of the present invention, comparator 136 determines whether or not relative phase indicator 134 has a value greater than or equal to $2^{M-1}$. In some embodiments of the present invention, comparator 136 may simply examine the most significant bit of the M-bit wide word that comprises relative phase indicator 134. Such an examination of the most significant bit of relative phase indicator 134 determines whether or not relative phase indicator 134 is greater than or equal to $2^{M-1}$.

If relative phase indicator 134 is greater than or equal to $2^{M-1}$, the phase between received clock 56 and master clock 72 is between 90° and 270°. On the other hand, if relative phase indicator 134 is less than $2^{M-1}$, then the phase between received clock 56 and master clock 72 is between −90° and +90°.

This output result of comparator 136 may be synchronously latched by latch 138, which may be clocked by master clock 72. This latched result is then used to select either master clock signal 72 or inverted master clock signal 140 for reclocking received data 58. This may be accomplished by utilizing multiplexer 142. Thus, multiplexer 142 effectively selects the rising or falling edge of master clock 72, which is then used as a clock signal for data resynchronizing register 144.

Data resynchronizing register 144 receives received data 58 at an input and outputs resynchronized data 88, according to the time relationship shown in FIGS. 3 and 4.

Figure 6:
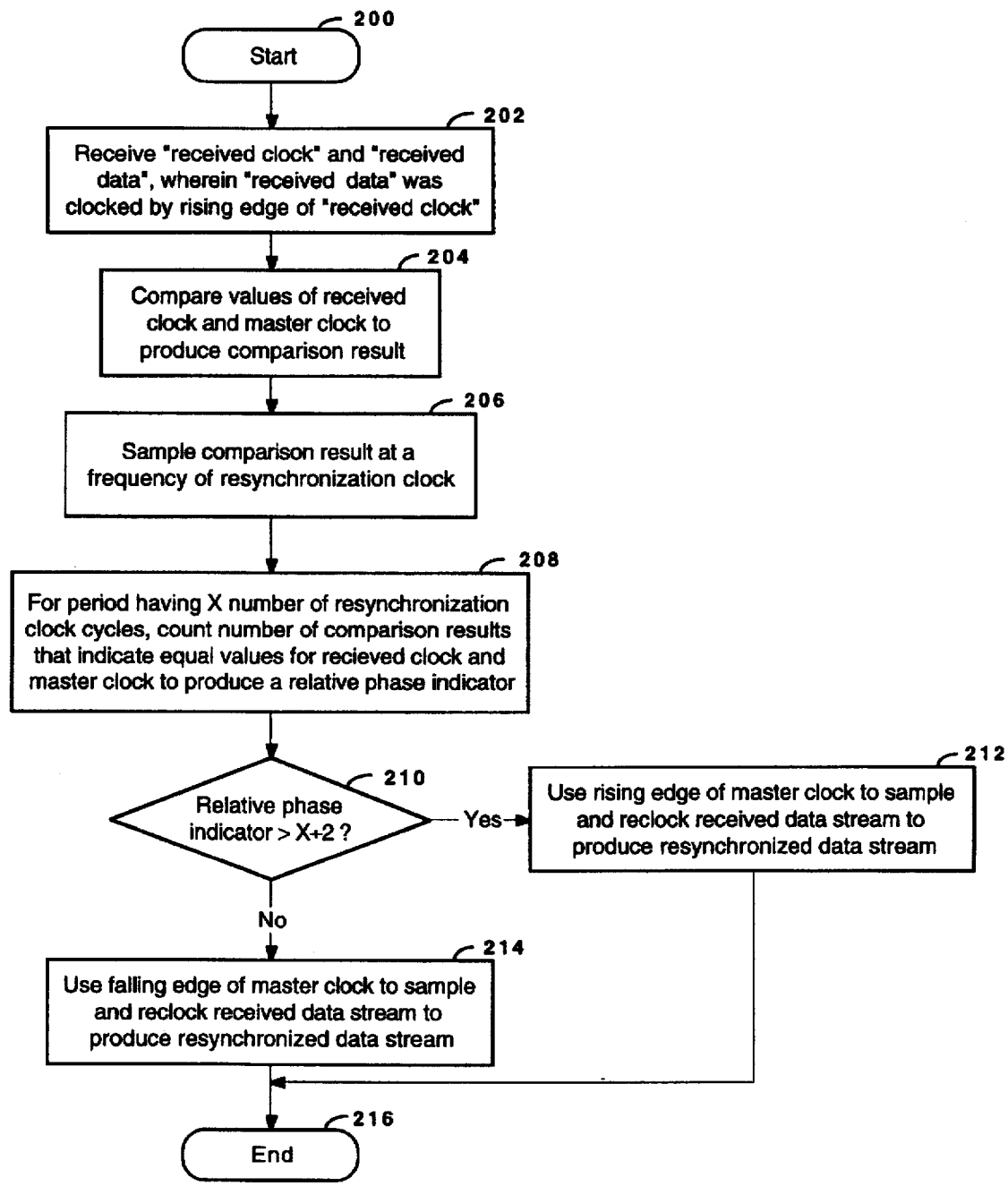
FIG. 6 is a high-level logic flow chart which illustrates an embodiment of the method of the present invention.

With reference to FIG. 6, there is depicted a logical flowchart of the process of resynchronizing a received data stream with a master clock according to the method and system of the present invention. As illustrated, the process begins at block 200 and thereafter passes to block 202 wherein the resynchronizing system receives a "received clock" and a "received data stream", wherein the received data stream was clocked by the rising edge of the received clock. Thereafter, the system compares the values of the received clock and the master clock to produce a comparison result, as illustrated at block 204. Such a comparison may be implemented by an exclusive-OR gate, such as exclusive-OR gate 120 illustrated in FIG. 5.

Next, the resynchronization system samples the comparison result at a rate determined by the frequency of a resynchronization clock, as depicted at block 206. An advantage of the present invention is that the frequency of the resynchronization clock may be less than the frequency of the master clock. A more detailed discussion of the selection of a resynchronization clock frequency follows the description of FIGS. 6 and 7.

Next, the resynchronization system counts the number of comparison results that indicate equal values for the received clock and the master clock for a period having X number of resynchronization clock cycles, as illustrated at block 208. The value of X is preferably selected so that the received clock and master clock comparison result is sampled at multiple degree intervals spanning an entire cycle—but not necessarily a single cycle—of the master clock. See FIG. 7 for a pictorial representation of this comparison and sampling process.

This count of comparison results may be considered a "relative phase indicator", which is a number proportional to the phase difference between the master clock and the received clock.

Thereafter, the resynchronization system determines whether or not the relative phase indicator is greater than a predetermined phase shift threshold, which in this example is X+2, assuming that received data is clocked on the rising edge, as depicted at decision block 210. If the relative phase indicator is greater than X+2, the rising edge of the master clock is selected to sample and reclock the received data stream to produce the resynchronized data stream, as illustrated at block 212. However, if the relative phase indicator is less than X+2, the resynchronization system selects the falling edge of the master clock to sample and reclock the received data stream to produce the resynchronized data stream, as depicted at block 214. If the relative phase indicator is equal to X+2, either edge may be used to reclock the received data stream—even though the rising edge is preferable because it is not as close to a data settling period. Thereafter, resynchronization of the received data stream continues by utilizing the appropriate edge of the master clock to reclock received data.

The process illustrated in FIG. 6 may be repeated periodically to determine whether or not a different edge of the master clock should be used for resynchronization. A different edge may be needed for resynchronization due to a change in phase relationship between master clock 72 and received clock 56. A change in phase relationship may occur because of a system reconfiguration that changes the distance between master system 50 and remote system 52.

Figure 7:
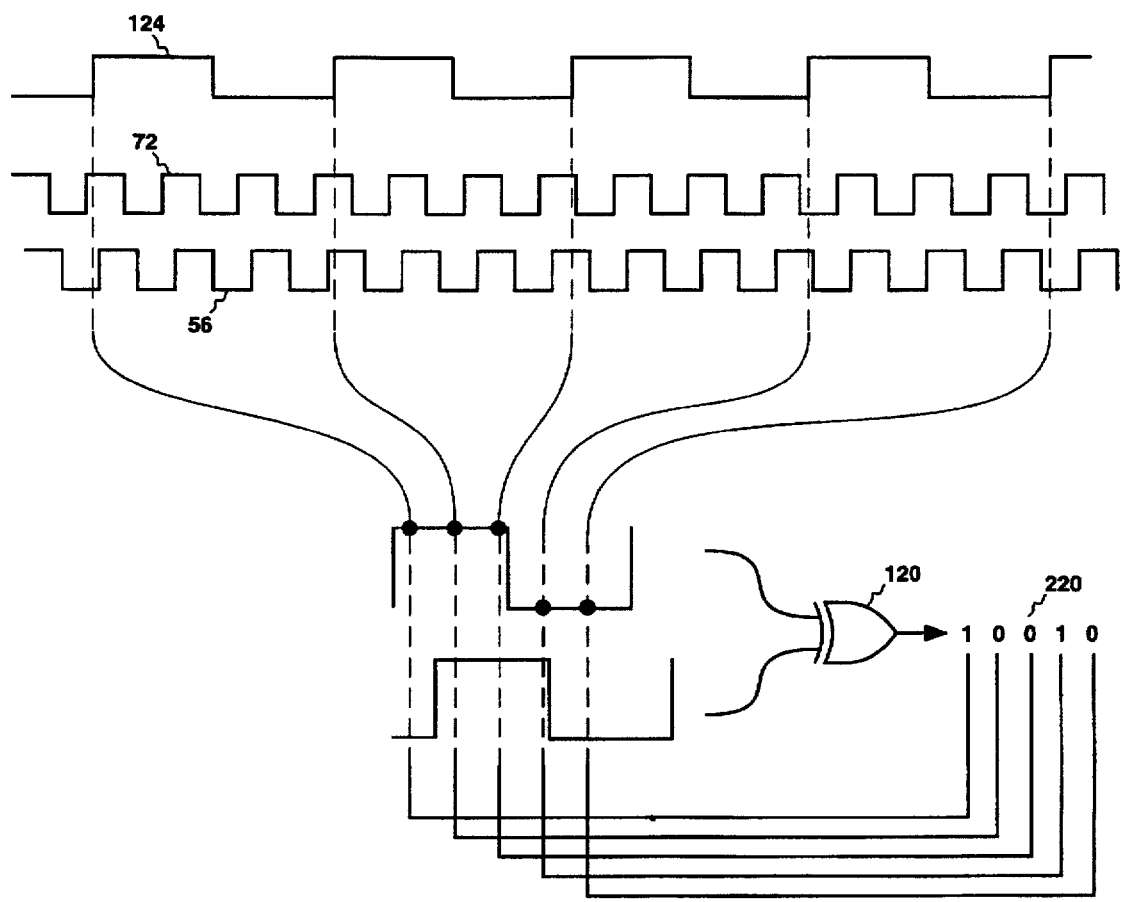
FIG. 7 is an expanded pictorial representation of a comparison of a master clock and a received clock in accordance with an embodiment of the method and system of the present invention.

Finally, with reference to FIG. 7, there is depicted a more detailed representation of a comparison of a master clock and a received clock in accordance with the method and system of the present invention. Master clock 72 and received clock 56 are shown in relation to one another. Received clock 56 is out of phase with master clock 72 by an arbitrary number of degrees. Resynchronization clock 124 is also shown relative to master clock 72 and received clock 56. According to an important aspect of the present invention, master clock 72 and received clock 56 are compared at a predetermined number of times to produce a plurality of comparison results.

In the example of FIG. 7, such "predetermined number of times" are located at the rising edges of resynchronization clock 124. FIG. 7 shows five rising edges. Note that the rising edges of resynchronization clock 124 may not occur within the same cycle of master clock 72. Moreover, rising edges of resynchronization clock 124 may not occur in adjacent cycles of master clock 72. In the example of FIG. 7, rising edges of resynchronization clock 124 occur in every third cycle of master clock 72. This illustrates that resynchronization clock 124 may have a lower frequency than master clock 72.

At the bottom of FIG. 7, the sampled comparison results have been superimposed upon one cycle of master clock 72 (and received clock 56). As can be seen in this one cycle, the sampled comparison results traverse the waveform of one master clock cycle—that is, all the comparison results are not sampled at the same number of degrees from the beginning of the master clock cycle.

Exclusive-OR gate 120 shows how the master clock waveform and the received clock waveform are compared to produce comparison results 220. Comparison results 220 will then be analyzed, or counted, to determine whether the rising edge or the falling edge of master clock 72 will be used to reclock and resynchronize received data 58.

In the examples described above, it is assumed that data from data source 78 is clocked on the rising edge of master clock 68 and data transmitted by data transmitter 62 is clocked on the rising edge of clock transmitter 60. If this relationship were different—that is, if data transmitter 62 transmitted on the falling edge of clock transmitter 60—the selection of rising and falling edges in blocks 212 and 214 of FIG. 6 would be reversed.

Although the resynchronization method and system of the present invention has been shown with an example having a master system and remote system, those persons skilled in the art should recognize that master system 50 and remote system 52 need not be separated by a large distance. In fact, the master system 50 and remote system 52 may be on the same circuit board or integrated circuit. The configuration depicted in FIG. 2 was selected to demonstrate a common set of circumstances under which received data and a received data clock may be out of phase with a master clock. Certainly, data may become out of phase on a single circuit board due to data processing that may occur on a synchronous serial data stream, or for any other similar reason.

With regard to the selection of a resynchronization clock frequency, the relationship between the master clock frequency and the resynchronization clock frequency determines the width of the counter used to count the comparison results. Therefore, the resynchronization clock frequency ($f_R$) should be chosen to optimize the results provided by the counter (see counter 126 in FIG. 5).

For example, if master clock 72 is operating at a frequency $f_M$ and received clock 56 is operating at the same frequency with an arbitrary phase relationship, and resynchronization clock 124 is operating at a frequency $f_R$, then there exists a fundamental frequency $f_0$ such that:

$$f_0 = \frac{f_M}{n_1} \text{ ; and}$$

$$f_0 = \frac{f_R}{n_2}$$

where $n_1$ and $n_2$ are integers (which will be true if $f_M$ and $f_R$ are rational numbers).

Therefore, the width "M" of counter 126 and counter 130 is based upon the following relationship:

$$\text{Let } T_0 = \frac{1}{f_0} \quad T_M = \frac{1}{f_M} \quad T_R = \frac{1}{f_R}$$

Then $$T_0 = n_1 * T_M$$

(where $n_1$=an integer >0), and $$T_0 = n_2 * T_R$$

(where $n_2$=an integer >0) or $$n_1 * T_M = n_2 * T_R$$

$$\text{or} \quad \frac{T_M}{T_R} = \frac{n_2}{n_1}$$

Solving for the smallest $n_1$ and $n_2$ (provided that $f_M$ and $f_R$ are rational) gives a solution for width "M:"

$$2^M \geq n_2 + 1$$

or $$M \geq \log_2(n_2+1)$$

(where M=an integer)

Width M of counters 126 and 130 are directly related to the ratio of the frequencies of master clock 72 and resynchronization clock 124. The larger the value of $n_2$, the more samples are required to cycle through one fundamental period ($T_0$) of master clock 72. A larger value for $n_2$ provides greater accuracy at the expense of larger counters 126 and 130.

For best performance, certain frequencies should not used for the resynchronization clock. Undesirable resynchronization clock frequencies include frequencies that are $2^n$ multiples of the master clock frequency, where n is an integer.

The foregoing description of a preferred embodiment of the invention has been presented for the purpose of illustration and description. It is not intended to be exhaustive or to limit the invention to the precise form disclosed. Modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims and their equivalents when interpreted in accordance with the breadth to which they are fairly, legally, and equitably entitled.

What is claimed is:

1. A method in a data processing system for resynchronizing a received data stream with a master clock having a master clock frequency, wherein said received data stream is clocked with a received data clock that is out of phase with said master clock by an arbitrary number of degrees, said method comprising the steps of:

at a resynchronization clock frequency, comparing a master clock value and a received data clock value for a predetermined number of times to produce comparison results;

based upon said comparison results, producing a relative phase indicator;

in response to said relative phase indicator exceeding a predetermined phase shift threshold and said received data stream being clocked with a rising edge of said received data clock, sampling said received data stream at a rising edge of said master clock to produce a resynchronized data stream;

in response to said relative phase indicator being less than said predetermined phase shift threshold and said received data stream being clocked with said rising edge of said received data clock, sampling said received data stream at a falling edge of said master clock to produce said resynchronized data stream;

in response to said relative phase indicator exceeding a predetermined phase shift threshold and said received data stream being clocked with a falling edge of said received data clock, sampling said received data stream at said rising edge of said master clock to produce a resynchronized data stream; and in response to said relative phase indicator being less than said predetermined phase shift threshold and said received data stream being clocked with said falling edge of said received data clock, sampling said received data stream at said falling edge of said master clock to produce said resynchronized data stream, wherein said resynchronized data stream is synchronized with said master clock and contains the data of said received data stream.

2. The method for resynchronizing a received data stream according to claim 1 wherein said step of comparing a master clock value and a received data clock value at a resynchronization clock frequency further includes comparing a master clock value and a received data clock value, wherein said frequency of said resynchronization clock is less than said master clock frequency.

3. The method for resynchronizing a received data stream according to claim 1 wherein said step of producing a relative phase indicator further includes counting said comparison results that indicate said value of said master clock and said value of said receive data clock are substantially equal to produce said relative phase indicator.

4. The method for resynchronizing a received data stream according to claim 1 wherein said predetermined phase shift threshold is equal to said predetermined number of times divided by 2.

5. The method for resynchronizing a received data stream according to claim 1 wherein said step of comparing a master clock value and a received data clock value for a predetermined number of times to produce comparison results further includes performing an exclusive-or operation on a master clock value and a received data clock value for a predetermined number of times to produce comparison results.

6. The method for resynchronizing a received data stream according to claim 3 wherein said step of counting said comparison results that indicate said value of said master clock and said value of said receive data clock are substantially equal to produce a relative phase indicator further includes counting said comparison results that indicate said value of said master clock and said value of said receive data clock are substantially equal to produce a relative phase indicator using an M-bit counter, where M is equal to $\log_2(PNT)$ rounded up to the next largest integer, wherein PNT is equal to said predetermined number of times.

7. The method for resynchronizing a received data stream according to claim 6 further including the step of examining a most significant bit of said M-bit counter to determine whether or not said relative phase indicator exceeds said predetermined number of times divided by 2.

8. The method for resynchronizing a received data stream according to claim 1 further including the step of stabilizing said comparison results.

9. An apparatus for resynchronizing a received data stream with a master clock having a master clock frequency, wherein said received data stream is clocked with a received data clock that is out of phase with said master clock by an arbitrary number of degrees, said apparatus comprising:

means for comparing, at a resynchronization clock frequency, a master clock value and a received data clock value for a predetermined number of times to produce comparison results;

means for producing a relative phase indicator based upon said comparison results;

means for sampling said received data stream at a rising edge of said master clock to produce a resynchronized data stream in response to said relative phase indicator exceeding a predetermined phase shift threshold and said received data stream being clocked with a rising edge of said received data clock;

means for sampling said received data stream at a falling edge of said master clock to produce said resynchronized data stream in response to said relative phase indicator being less than said predetermined phase shift threshold and said received data stream being clocked with said rising edge of said received data clock;

means for sampling said received data stream at said falling edge of said master clock to produce a resynchronized data stream in response to said relative phase indicator exceeding a predetermined phase shift threshold and said received data stream being clocked with a falling edge of said received data clock; and means for sampling said received data stream at said rising edge of said master clock to produce said resynchronized data stream in response to said relative phase indicator being less than said predetermined phase shift threshold and said received data stream being clocked with said falling edge of said received data clock, wherein said resynchronized data stream is synchronized with said master clock and contains the data of said received data stream.

10. The apparatus for resynchronizing a received data stream according to claim 9 wherein said means for comparing a master clock value and a received data clock value at a resynchronization clock frequency further includes means for comparing a master clock value and a received data clock value, wherein said frequency of said resynchronization clock is less than said master clock frequency.

11. The method for resynchronizing a received data stream according to claim 9 wherein said means for producing a relative phase indicator further includes means for counting said comparison results that indicate said value of said master clock and said value of said receive data clock are substantially equal to produce said relative phase indicator.

12. The apparatus for resynchronizing a received data stream according to claim 9 wherein said predetermined phase shift threshold is equal to said predetermined number of times divided by 2.

13. The apparatus for resynchronizing a received data stream according to claim 9 wherein said means for comparing a master clock value and a received data clock value for a predetermined number of times to produce comparison results further includes means for performing an exclusive-or operation on a master clock value and a received data clock value for a predetermined number of times to produce comparison results.

14. The apparatus for resynchronizing a received data stream according to claim 11 wherein said means for counting said comparison results that indicate said value of said master clock and said value of said receive data clock are substantially equal to produce a relative phase indicator further includes means for counting said comparison results that indicate said value of said master clock and said value of said receive data clock are substantially equal to produce a relative phase indicator using an M-bit counter, where M is equal to $\log_2(PNT)$ rounded up to the next largest integer, wherein PNT is equal to said predetermined number of times.

15. The apparatus for resynchronizing a received data stream according to claim 14 further including means for examining a most significant bit of said M-bit counter to determine whether or not said relative phase indicator exceeds said predetermined number of times divided by 2.

16. The apparatus for resynchronizing a received data stream according to claim 9 further including means for stabilizing said comparison results.

17. A data processing system for resynchronizing a received data stream with a master clock having a master clock frequency, said data processing system comprising:

a master clock for producing a master clock signal and an inverted master clock signal;

a resynchronization clock for producing a resynchronization clock signal; a received clock source for producing a received clock signal;

a comparator having inputs coupled to said master clock signal and said received clock signal, wherein said comparator produces a comparison result that indicates whether said master clock signal and said received clock signal are substantially equal;

a counter responsive to said comparison result for periodically counting said comparison result for a predetermined number of cycles of said resynchronization clock signal to produce a relative phase indicator;

a master clock polarity selector for selecting said master clock signal or said inverted master clock signal in response to said relative phase indicator;

a data resynchronizing register having an input coupled to said received data stream, said data resynchronizing register for reclocking said received data stream based on said master clock polarity selector to produce a resynchronized data stream.

18. The data processing system for resynchronizing a received data stream with a master clock according to claim 17 wherein said comparator includes an exclusive-or gate.

19. The data processing system for resynchronizing a received data stream with a master clock according to claim 17 wherein said counter includes an M-bit serial adder wherein M is at least $\log_2(PNCRC)$ rounded up to the next largest integer, wherein PNCRC is equal to said predetermined number of cycles of said resynchronization clock signal.

20. The data processing system for resynchronizing a received data stream with a master clock according to claim 17 wherein said master clock polarity selector includes a master clock polarity selector responsive to a comparison of said relative phase indicator and a phase shift threshold.

21. The data processing system for resynchronizing a received data stream with a master clock according to claim 20 wherein said phase shift threshold is equal to said predetermined number of cycles of said resynchronization clock signal divided by 2.

22. The data processing system for resynchronizing a received data stream with a master clock according to claim 17 wherein said master clock polarity selector includes a multiplexer.

23. A method in a data processing system for resynchronizing a received data stream with a master clock having a master clock frequency, wherein said received data stream is clocked with a received data clock that is out of phase with said master clock by an arbitrary number of degrees, said method comprising the steps of:

at a resynchronization clock frequency, comparing a master clock value and a received data clock value for a predetermined number of times to produce comparison results;

based upon said comparison results, producing a relative phase indicator; and in response to said relative phase indicator exceeding a predetermined phase shift threshold and said received data stream being clocked with a rising edge of said received data clock, sampling said received data stream at a rising edge of said master clock to produce a resynchronized data stream.

24. A method in a data processing system for resynchronizing a received data stream with a master clock having a master clock frequency, wherein said received data stream is clocked with a received data clock that is out of phase with said master clock by an arbitrary number of degrees, said method comprising the steps of:

at a resynchronization clock frequency, comparing a master clock value and a received data clock value for a predetermined number of times to produce comparison results;

based upon said comparison results, producing a relative phase indicator; and in response to said relative phase indicator being less than said predetermined phase shift threshold and said received data stream being clocked with said rising edge of said received data clock, sampling said received data stream at a falling edge of said master clock to produce said resynchronized data stream.

25. A method in a data processing system for resynchronizing a received data stream with a master clock having a master clock frequency, wherein said received data stream is clocked with a received data clock that is out of phase with said master clock by an arbitrary number of degrees, said method comprising the steps of:

at a resynchronization clock frequency, comparing a master clock value and a received data clock value for a predetermined number of times to produce comparison results;

based upon said comparison results, producing a relative phase indicator; and in response to said relative phase indicator exceeding a predetermined phase shift threshold and said received data stream being clocked with a falling edge of said received data clock, sampling said received data stream at said rising edge of said master clock to produce a resynchronized data stream.

26. A method in a data processing system for resynchronizing a received data stream with a master clock having a master clock frequency, wherein said received data stream is clocked with a received data clock that is out of phase with said master clock by an arbitrary number of degrees, said method comprising the steps of:

at a resynchronization clock frequency, comparing a master clock value and a received data clock value for a predetermined number of times to produce comparison results;

based upon said comparison results, producing a relative phase indicator; and in response to said relative phase indicator being less than said predetermined phase shift threshold and said received data stream being clocked with said falling edge of said received data clock, sampling said received data stream at said falling edge of said master clock to produce said resynchronized data stream.

* * * * *